United States Patent
Jenkins et al.

(10) Patent No.: US 9,285,062 B2
(45) Date of Patent: Mar. 15, 2016

(54) SPIRAL-WOUND GASKET

(75) Inventors: Willie A. Jenkins, Humble, TX (US);
Julie L. Simonton, Prairieville, LA (US)

(73) Assignee: Lamons Gasket Company, Houston, TX (US)

( * ) Notice: Subject to any disclaimer, the term of this patent is extended or adjusted under 35 U.S.C. 154(b) by 0 days.

(21) Appl. No.: 12/255,248

(22) Filed: Oct. 21, 2008

(65) Prior Publication Data

US 2009/0115139 A1 May 7, 2009

Related U.S. Application Data

(60) Provisional application No. 61/001,563, filed on Nov. 2, 2007.

(51) Int. Cl.
| | |
|---|---|
| F16J 15/02 | (2006.01) |
| F16L 17/06 | (2006.01) |
| F16L 23/16 | (2006.01) |
| F16L 23/18 | (2006.01) |

(52) U.S. Cl.
CPC ............ *F16L 23/167* (2013.01); *F16L 23/18* (2013.01)

(58) Field of Classification Search
CPC .................................................. F16J 15/125
USPC ................................................. 277/610, 633
See application file for complete search history.

(56) References Cited

U.S. PATENT DOCUMENTS

| | | | | |
|---|---|---|---|---|
| 2,127,372 | A | * | 8/1938 | Victor et al. ............ 277/592 |
| 2,828,987 | A | * | 4/1958 | Schmitz ................. 277/610 |
| 5,082,296 | A | * | 1/1992 | Aizawa et al. .......... 277/610 |
| 5,161,807 | A | * | 11/1992 | Allen et al. ............. 277/610 |
| 5,275,423 | A | * | 1/1994 | Allen et al. ............. 277/610 |
| 5,511,797 | A | * | 4/1996 | Nikirk et al. ........... 277/609 |
| 5,645,284 | A | | 7/1997 | Fitton .................... 277/204 |
| 5,669,613 | A | * | 9/1997 | Lubienski .............. 277/610 |
| 5,683,091 | A | * | 11/1997 | Isoe et al. .............. 277/610 |
| 5,785,322 | A | * | 7/1998 | Suggs et al. ............ 277/615 |
| 5,794,946 | A | | 8/1998 | Owen .................... 277/610 |
| 5,823,542 | A | * | 10/1998 | Owen .................... 277/603 |
| 5,913,522 | A | * | 6/1999 | Koch ..................... 277/610 |
| 2003/0132576 | A1 | * | 7/2003 | Stancik ................. 273/292 |
| 2005/0006858 | A1 | * | 1/2005 | Hoyes et al. ............ 277/628 |
| 2005/0121859 | A1 | | 6/2005 | Seidel et al. ............ 277/628 |

OTHER PUBLICATIONS

Barry, "Evolution of New Gasket Type Increases Reliability in HF Alkylation Unit", 12th Worldwide Alkylation Symposium, Jun. 4-9, 2006, Orlando, FL,(Power Point slides), 12 pgs.

Simonton, et al., "Evolution of New Gasket Type Increases Reliability in HF Alkylation Unit", 2006 ASME Pressure Vessels and Piping Division Conference, Jul. 23-27, 2006, Vancouver, British Colombia, 3 pgs.

* cited by examiner

*Primary Examiner* — Vishal Patel

(74) *Attorney, Agent, or Firm* — Woodard, Emhardt, Moriarty, McNett & Henry LLP

(57) ABSTRACT

A spiral-wound gasket for use in a HF alkylation unit and positioning between facing conduit flanges includes an outer ring, an inner ring, and low-compression spiral-wound portion positioned between the outer ring and the inner ring.

6 Claims, 4 Drawing Sheets

SPIRAL-WOUND GASKET

CROSS REFERENCES TO RELATED APPLICATIONS

The present application claims the benefit of U.S. Provisional Application No. 61/001,563, filed Nov. 2, 2007.

BACKGROUND OF THE INVENTION

The present invention relates generally to gaskets, and more particularly, to an improved spiral-wound gasket having an outer ring and an inner ring. The present gasket is adapted to be disposed between flanges of a pipe or vessel to prevent fluid leakage. Sections of pipe are connected to form a pipeline to direct various fluids from one location to another. To facilitate connection of the pipes, flanges are formed on the ends which may be connected to a subsequent pipe flange using a plurality of bolts. The gasket is inserted between the flanges to prevent fluid leakage.

The evolution of a new gasket type for use in Hydrofluoric (HF) Alkylation Units from the standard HF alkylation spiral-wound type gaskets, (monel windings, PTFE filler, and outer carbon steel ring) to a more specialized and robust gasket type was driven by a need to minimize flange face corrosion, overcome handling limitations and improve sealing performance. One design objective was to protect the carbon steel flange face from aggressive HF acid corrosion and resulting iron fluoride scaling, while increasing both the reliability and sealability of an HF connection. The desired result was to prevent costly flange damage, potential leakage and associated unit shutdowns required for repairs.

Flange corrosion due to the aggressiveness of hydrofluoric acid has been prevalent in chemical units for many years, causing thousands of dollars in maintenance, repair and replacement costs. The standard ASME B16.20 spiral-wound type gasket with monel windings, PTFE filler and an outer carbon steel locating ring left the flange face within the inside diameter of the gasket vulnerable to exposure from the corrosive process.

To prevent corrosion along the entire flange face, the gasket would need to begin sealing the process at the bore, preventing the acid from migrating outward and contaminating the mating flanges surfaces (see FIG. 1).

The first attempt to protect the flange faces from the corrosive hydrofluoric acid was the specification of a standard inner ring. In 1993, ASME B16.20 mandated the use of inner rings on all standard spiral-wound type gaskets with the PTFE filler material to prevent inward buckling of the spiral windings. Since the initial gasket design lacked an inner ring, the new specification included a monel inner ring. However, even with the inner ring, when the flanges were opened for routine maintenance, flange face corrosion was prevalent from the bore to the inside diameter of the raised face.

It was evident that the inclusion of an inner ring alone was not the solution. Although the inner ring of a spiral-wound type gasket reinforces the inside diameter of the winding element and prevents buckling, it unfortunately does not function as a direct sealing element. In fact, it was discovered that this configuration allowed the corrosive process to seep under the inner ring and cause even more extensive damage to the flange faces than without an inner ring, (see FIG. 2).

The need for a gasket to not only seal the process, but also prevent corrosion of the inside diameter of the mating flange faces was now imperative. To accomplish this, the gasket would need to seal the process at the bore, not just on the raised face. This meant the inner ring would need to effectively seal.

The second attempt to protect the flange faces was the specification of a PTFE inner ring within the standard spiral-wound type gasket. A 0.150" thick sintered PTFE ring was cut to meet the standard inner ring dimensions per ASME B16.20 and inserted into the standard ASME B16.20 spiral-wound type gasket with monel windings, PTFE filler and an outer carbon steel locating ring. The 0.150" thickness of the PTFE inner ring allowed for compressive load to be applied and promote sealing on the inner ring portion of the gasket without affecting the compressibility of the spiral windings. Unfortunately, due to a high coefficient of thermal expansion, the PTFE inner ring was notorious for shrinking and dislodging from the spiral windings, especially during handling, (see FIG. 3).

It became evident that a PTFE sheet gasket material was not a durable solution for achieving a seal as an inner ring. The decision was made to return to a metal inner ring. However, the standard configuration of a spiral-wound type gasket with a costly monel inner ring had already proved to be ineffective against preventing corrosion over the entire flange face.

Drawing from the success of another gasket type in the industry, the standard 0.125" thick inner ring was added to the standard spiral-wound type gasket with monel windings, PTFE filler and a carbon steel locating ring, and modified to include machined serrations on the ring faces, as seen in the "kammprofile", or serrated metal type gasket. The term "kammprofile" refers to a "comb profile" and is used to describe a gasket design or a portion of a gasket, such as an inner ring, having serrations on each face. As used herein, this term is defined to include such a serrated construction that is coated in PTFE and faced with either graphite or PTFE. Carbon steel was chosen as the inner ring metal and a U-shaped PTFE envelope was incorporated to protect the inside diameter and faces of the carbon steel inner ring. This modified spiral-wound type gasket now contained "dual" sealing components: the kammprofile type inner ring and the spiral winding elements which seal on the raised face, (see FIG. 4).

When the flanged connections were opened after utilizing this type of gasket, it was found that in some cases the PTFE enveloped hindered successful sealing of the inner ring due to various factors: 1) envelopes were prone to folding, perhaps during installation, leaving areas of the serrated metal exposed and allowing corrosion to take place; 2) shearing of the seams of the U-shaped envelope and extrusion of the PTFE into the bore was observed in some of the flanges where corrosion had taken place; and 3) in other cases, PTFE envelopes were found downstream, completely dislodged from the gasket serrated inner ring.

The inner ring design was again modified. The standard dimensions of an inner ring per ASME B16.20 were maintained and kammprofile type serrations were machined in the faces of each ring as before. However, this time the serrated inner ring was coated with PTFE to prevent direct contact of the process with the metal. The PTFE coated machined serrations were then faced with 0.020" thick flexible graphite. The monel winding metal was maintained, however the filler material was changed from PTFE to flexible graphite the provide a "fire-safe" feature, (see FIG. 5).

Although the foregoing gasket evolution resulted in a construction that addressed several of the identified performance issues, there remained an opportunity for still further gasket design improvements. The focus of these further improvements, as disclosed herein, is directed to the construction and arrangement of the spiral-wound portion of the gasket and its combination with the remainder of the gasket construction.

BRIEF SUMMARY

A spiral-wound gasket for use in a HF alkylation unit and positioning between facing conduit flanges includes an outer ring, an inner ring, and low-compression spiral-wound portion positioned between the outer ring and the inner ring. The spiral-wound portion having an alternating sequence of metal windings and sealant strips. The inner ring having grooves and a flexible graphite coating.

One object of the present disclosure is to describe a spiral-wound gasket for use in a HF alkylation unit.

DETAILED DESCRIPTION

Figure 1:
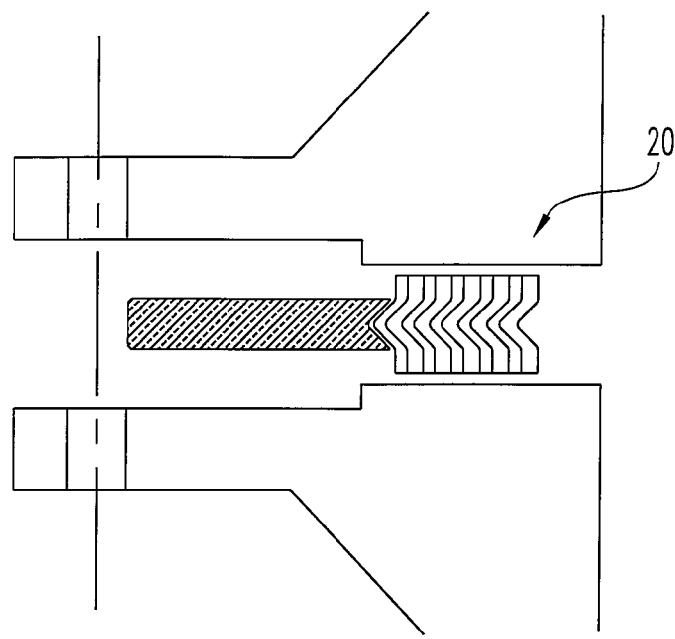
FIG. 1 is a partial schematic illustration, in partial section, of an installed HFA gasket representing the original construction of the prior art.
Figure 2:
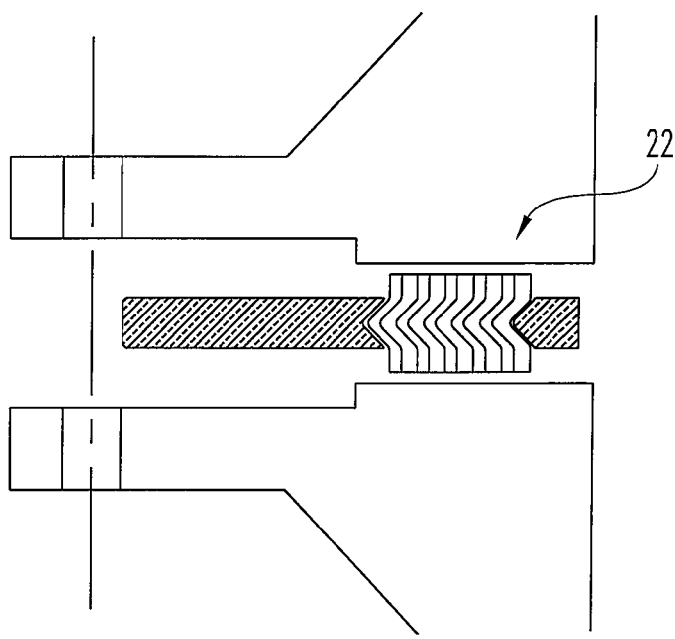
FIG. 2 is a partial schematic illustration, in partial section, of an installed HFA gasket representing a first evolution of the prior art.
Figure 3:
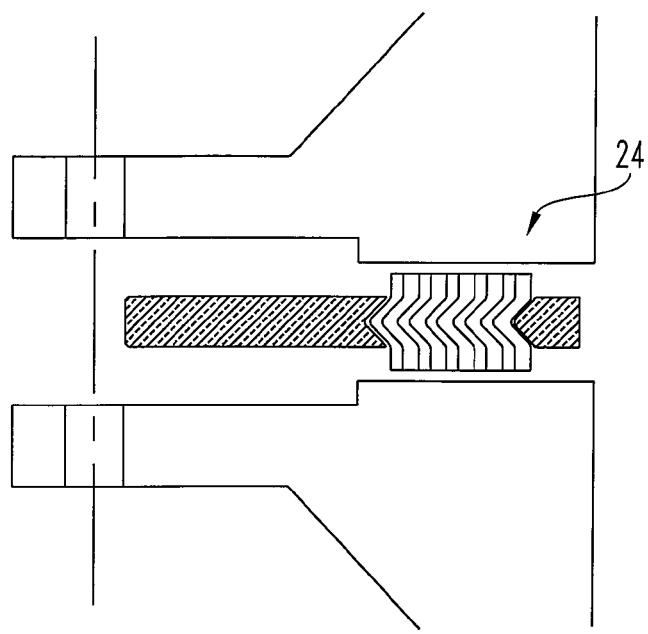
FIG. 3 is a partial schematic illustration, in partial section, of an installed HFA gasket representing a second evolution of the prior art.
Figure 4:
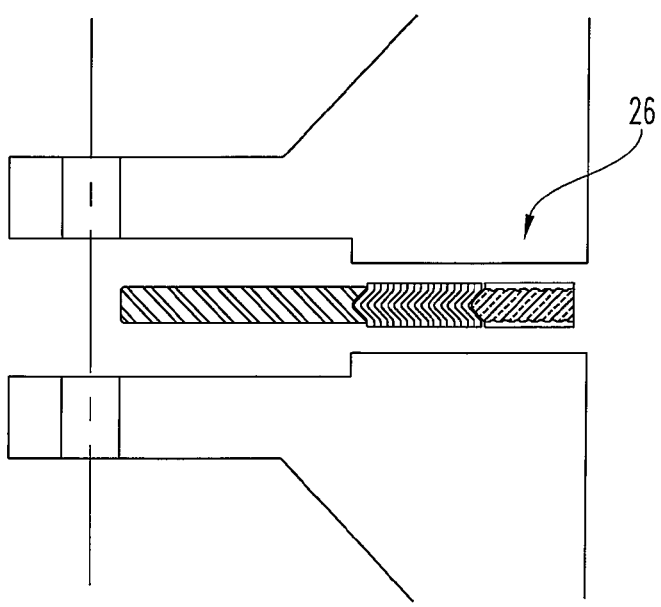
FIG. 4 is a partial schematic illustration, in partial section, of an installed HFA gasket representing a third evolution of the prior art.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Referring briefly to prior art drawing FIGS. 1-5, gasket 20 of FIG. 1 represents the starting HFA gasket construction that is discussed in the Background. The first evolution, as described, resulted in gasket 22 of FIG. 2. The second evolution, as described, resulted in gasket 24 of FIG. 3. The third evolution, as described, resulted in gasket 26 of FIG. 4. The fourth evolution, as described, resulted in gasket 28 of FIG. 5.

Figure 6:
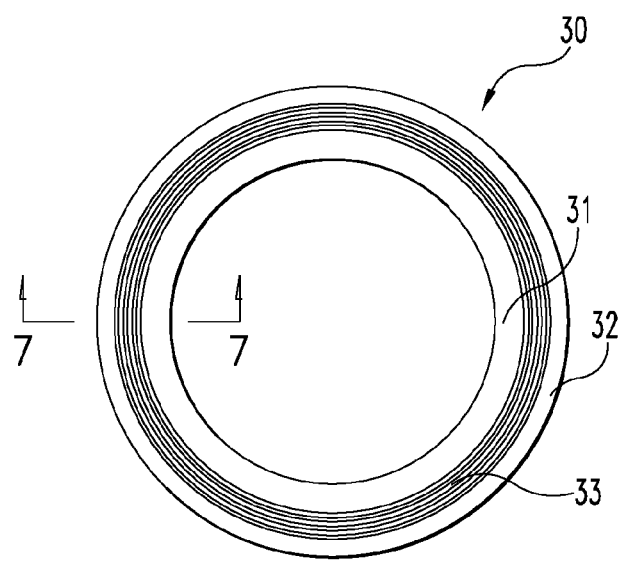
FIG. 6 is a top plan view of a spiral-wound gasket according to the present disclosure.

Referring now to FIGS. 6-9, the new gasket construction, according to the present disclosure, is illustrated. Considering the ending design of gasket 28, the evaluation of its construction and performance involved an analysis of the compression aspects of the spiral-wound portion. As illustrated in FIG. 6, gasket 30 includes an inner ring 31, an outer ring 32, and a spiral-wound portion 33 that is positioned radially between the inner ring 31 and the outer ring 32.

With continued reference to FIGS. 6-9, the inner ring 31 has grooves 36 along the top and bottom surfaces (see FIG. 8), which may be, for example, serrated edges. In an exemplary embodiment, the inner ring 31 is a grooved carbon steel ring having serrated surfaces. However, it will be appreciated that the inner ring may be constructed from any suitable material, including but not limited to, metal, polymer, composite, etc., and may or may not include grooves or serrated surfaces.

The inner ring 31 also has a coating 37 which may be, for example, PTFE and/or flexible graphite. As a result, the inner ring 31 does not shrink or dislodge due to temperature changes. In addition, the coating 37 allows the gasket 30 to flow into a surface finish of the gasket seating area 38 (i.e., flange face) of respective pipe flanges 39. As a result, the gasket 30 remains in position to effectuate a seal. The coating 37 eliminates the need for a PTFE envelope and the issues associated with its use while preventing direct contact with the corrosive process and the metal ring. Ideally, the gasket 30 maintains dimensions of the standard ASME B16.20. However, the gasket 30 is not deemed as limited to such dimensions and one of ordinary skill in the art will appreciate that the gasket 30 will be effective over a wide range of dimensions. Moreover, in the illustrative embodiment, the inner diameter of the inner ring 31 is substantially similar to the diameter of the through bores 42 of the respective pipe flanges 39 such that an inner face 31a of the inner ring 31 is substantially flush with the through bores 42 when the gasket 30 is in place between the flanges 39. The use of "diameter" and the use of the same reference number (42) for the bore of each flange 39 is intended to convey that the flange bores 42 are of substantially the same bore size which in the exemplary embodiment means having substantially the same diameter. Advantageously, the inner ring 31 eliminates crevices typically found at the mating of pipe flanges 39; and, consequently, the elimination of these crevices improves the laminar flow of fluid through the pipes, thereby extending the service life of the pipes, pipe flanges 39 and gasket 30.

Figure 5:
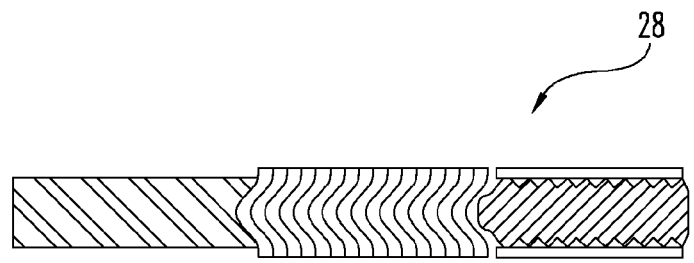
FIG. 5 is a partial schematic illustration, in partial section, of an installed HFA gasket representing a fourth evolution of the prior art.

After considering performance aspects of the FIG. 5 gasket, it was discovered that by changing the construction of the spiral-wound portion 33 to a low compression design, it would offer a performance improvement. The amount of gasket contact area with the flanges 39 had been raised as a concern with the earlier gasket constructions of FIGS. 1-5, specifically gasket 28 of FIG. 5. By changing the gasket construction for this specific application to a low compression gasket, represented by gasket 30, the load required to compress the gasket is reduced.

One style of low compression gasket is disclosed in U.S. Pat. No. 5,794,946, issued Aug. 18, 1998. This style is constructed and arranged to compress and seal under various loads. This gasket design generally includes a spiral-wound portion and an outer guide ring to limit the compression of the gasket. The spiral winding is formed of interdisposed windings of a metal and an elastomer sealant. The metal winding has a non-planar cross section to inhibit buckling under compression. The gasket is dimensioned such that the elastomer sealing winding has an axial width greater than the axial width of the metal winding which has an axial width greater than the thickness of the guide ring.

Figure 7:
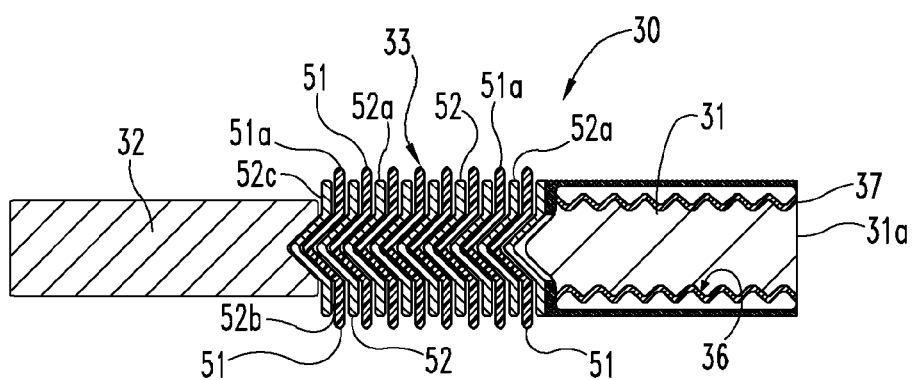
FIG. 7 is a front elevational view, in full section, of the FIG. 6 spiral-wound gasket, as viewed along line 7-7 in FIG. 6.
Figure 8:
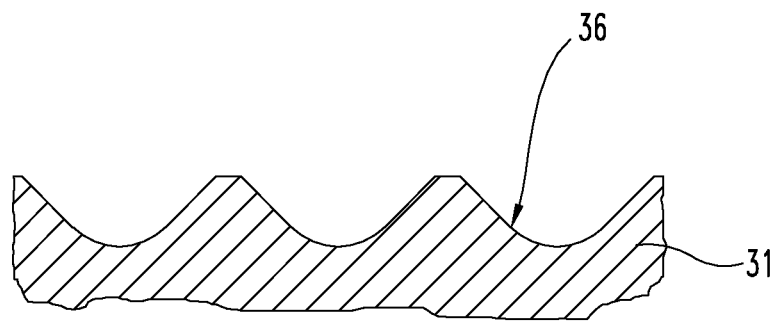
FIG. 8 is a partial, front elevational view, in an enlarged detail, of the inner construction of an inner ring portion of the FIG. 6 spiral-wound gasket.
Figure 9:
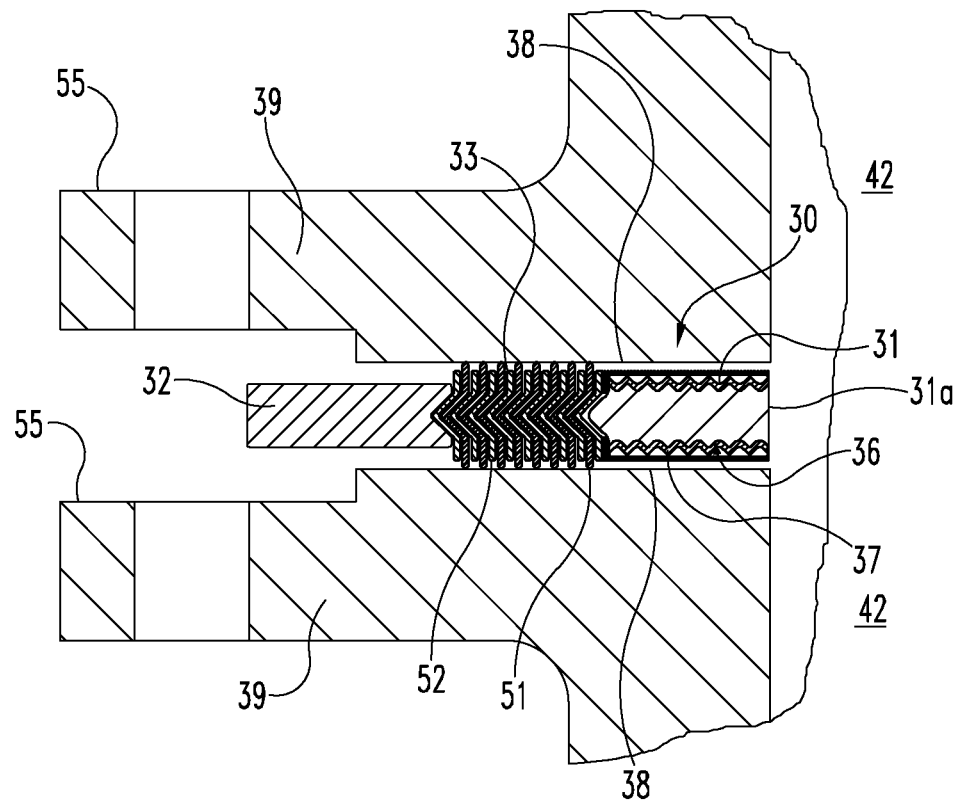
FIG. 9 is a partial, front elevational view, in full section, of the FIG. 6 spiral-wound gasket, as installed between facing pipe flanges.

The specific style of the spiral-wound portion 33 that is now utilized as part of gasket 30 is illustrated in greater detail in FIGS. 7 and 9. This spiral-wound portion 33 has a generally ring-shaped form (see FIG. 6) and includes a metal band or wire having a first predetermined axial width with a sealant strip 51 of a greater axial width interspersed between the metal windings 52 to form a laminated spiral winding represented by portion 33. The metal band providing the cumulative group of metal windings 52 acts as a resilient supporting material and may have a curved or chevron-shaped profile so as to act as a spring and retard buckling during compression. It will, however, be appreciated that the metal windings 52 forming the metal band may be constructed from any sufficiently durable and resilient material, including but not limited to a polymer or a composite. The sealant strip 51 is a soft gasket material, which may be, for example, a polymeric material. In one embodiment, each metal winding 52 has an axial width of between 0.145 inches and 0.165 inches while each sealant strip 51 has an axial width of between 0.175 and 0.185 inches, depending upon the application. However, it will be appreciated that each metal band winding 52 and each sealant strip 51 may have any suitable axial width. In addition, in one embodiment, the axial width of the metal band is significantly greater than the height of outer ring 32, but, again, it will be appreciated that the metal band may have any suitable axial width.

The illustrated embodiment of FIGS. 6-9 is a typical two inch size gasket and the referenced dimensions are applicable for this size gasket. However, the size relationships described herein are fully applicable for all gasket sizes constructed and arranged according to the broad scope of this disclosure. This includes the fact that the height of the sealant strips 51 is greater than the height of the metal windings 52. Further included is the fact that the height of the metal windings 52 is greater than the height of outer ring 32. In terms of dimensional directions, "height" refers to the direction that is parallel to the axial centerline of the gasket 30.

As for some of the other dimensions of this representative two inch size gasket, the inside diameter of inner ring 31 is approximately 2.19 inches and its outside diameter where it joins the spiral-wound portion 33 is approximately 2.75 inches. The inside diameter of portion 33 corresponds to the outside diameter of inner ring 31. The outside diameter of portion 33 and thus the inside diameter of outer ring 32 is approximately 3.375 inches. The outside diameter of outer ring 32 and thus of gasket 30 is approximately 4.125 inches.

In the illustrative embodiment of FIGS. 6-9, the outer ring 32 is a conventional outer guide ring having a metallic core to provide robustness to the gasket 30. To this end, the outer ring 32 provides the gasket 30 with additional radial strength to prevent gasket blowout and, more specifically, to act as a compression stop for the spiral-wound portion 33. In addition, the outer ring 32 is utilized to center the gasket 30 on a flange face 38. In the illustrative embodiment, the "height" which corresponds to the axial width of the outer ring 32 is less than the height or axial width of the spiral-wound portion 33. Generally, the metal portion of the outer ring 32 has a height of between 0.115 inches and 0.131 inches. Accordingly, the metal band (i.e., windings 52) of the spiral-wound portion 33 is higher or axially wider or thicker than the outer ring 32 and the sealant strip 51 is higher than the metal band. However, it will be appreciated that the outer ring 32, metal band, and sealant strip 51 may have any suitable axial width, consistent with the structural relationships disclosed herein, depending on the intended application, dimensional interfaces, and materials.

Each metal winding 52 has a radially inner surface 52b and a radially outer surface 52c. The exposed end surface 52a extends from the radially inner surface 52b to the radially outsurface 52c. As is clearly illustrated in FIG. 7, the axially extending end portion 51a of each sealant strip 51 extends beyond and is positioned between adjacent metal windings 52, without any overlap. The "without any overlap" description is defined herein to mean that no part of any end portion 51a radially extends over any portion of the exposed end surface 52a of either of its adjacent metal windings 52 prior to compression. This allows the end portions 51a to initially compress without being restricted in the axial direction by exposed end surfaces 52a.

Referring now to FIG. 9, the gasket 30 is disposed between a pair of adjacent pipe flanges 39 each having a through bore 42 for fluid flow. Typically, each flange 39 has a raised face 38 and a periphery shoulder 55. The gasket 30 is disposed between the flanges 39 such that the inner ring 31 is disposed between the raised faces 38 and the inner face 31a of the inner ring 31 is flush with the through bores 42. In addition, the spiral-wound portion 33 is disposed between the raised faces 38 and the outer ring 32 extends into the gap between the flange shoulders 55. The flanges 39 are brought together and coupled via a plurality of bolts, which also compresses the gasket 30. As a result, the gasket 30 seals over the spiral-wound portion 33 and the inner ring 31. Initially, the coating 37 of the inner ring 31 densifies into the grooves 36 to initiate the seal, while the sealant windings 51 of the spiral-wound portion 33 are compressed to also initiate the seal. Thereafter, compression of both the metal windings 52 and sealing strip windings 51 continues until the compression limit created by the outer ring 32 is engaged. Advantageously, the combination of the inner ring 31 and spiral-wound portion 33 in the present gasket 30 allows the gasket 30 to effectuate a seal under less loads than other gaskets. Furthermore, the inner ring 31 allows a primary seal to be created at the inner ring 31 and a secondary seal at the spiral-wound portion 33. As a result, the flange faces 38 are protected from corrosion and laminar flow through the through bores 42 is maintained.

With continued reference to FIG. 9 and the spiral-wound portion 33, reference has been made to the low compression construction and the unique realization that this style the environment of a hydrofluoric alkylation unit. One structural feature that contributes to the low compression quality is the use of (stainless steel) wire with a reduced width. By going to a narrower width for the low compression style, there is less load required to compress the gasket, in this case gasket 30.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A spiral-wound gasket for use between facing flanges of two flow conduit sections, each flow conduit section defining a through bore, said spiral-wound gasket comprising:
    an outer ring;
    a metal inner ring having an annular inner face which is flush with said through bores, said inner ring having grooves and ridges along upper and lower surfaces of said inner ring and a coating directly on said grooves and said ridges; and
    a low-compression, spiral-wound portion positioned between said outer ring and said inner ring, said spiral-wound portion having an alternating sequence of metal windings and polymeric sealant strips, wherein each metal winding having a first axial width dimension and each sealant strip having a second axial width dimension, said second axial width dimension is larger than said first axial width dimension, wherein said second axial width dimension is between about 0.175 inches and about 0.185 inches and said first axial width dimension is between about 0.145 inches and about 0.165 inches.

2. The spiral-wound gasket of claim 1 wherein said outer ring has a thickness dimension and said second axial width dimension being larger than said thickness dimension.

3. The spiral-wound gasket of claim 1 wherein said coating is flexible graphite or PTFE.

4. The spiral-wound gasket of claim 1 wherein each metal winding has an exposed end surface and each sealant strip has an axially extending end portion which is constructed and arranged without any overlap with any one of said exposed end surfaces prior to compression.

5. The spiral-wound gasket of claim 4 wherein each axially extending end portion of said alternating sequence is in direct contact with said facing flanges during compression.

6. The spiral-wound gasket of claim 2 wherein said thickness dimension is between 0.115 inches and 0.131 inches.

* * * * *